United States Patent
Iwata et al.

(10) Patent No.: US 10,054,091 B2
(45) Date of Patent: Aug. 21, 2018

(54) SLIDING MEMBER

(71) Applicant: DAIDO METAL COMPANY LTD., Nagoya (JP)

(72) Inventors: Hideki Iwata, Inuyama (JP); Yasushi Saito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 460 days.

(21) Appl. No.: 14/958,203

(22) Filed: Dec. 3, 2015

(65) Prior Publication Data

US 2016/0160824 A1 Jun. 9, 2016

(30) Foreign Application Priority Data

Dec. 8, 2014 (JP) .................. 2014-248485
Dec. 8, 2014 (JP) .................. 2014-248486

(51) Int. Cl.
*B32B 15/18* (2006.01)
*F02M 59/44* (2006.01)
(Continued)

(52) U.S. Cl.
CPC ............ *F02M 59/445* (2013.01); *B32B 15/16* (2013.01); *B32B 15/18* (2013.01); *C22C 19/03* (2013.01); *C22C 19/05* (2013.01); *C22C 38/00* (2013.01); *C23C 28/00* (2013.01); *C23C 30/00* (2013.01); *F16C 33/206* (2013.01); *F16C 33/208* (2013.01); *B32B 2260/025* (2013.01); *B32B 2260/046* (2013.01); *B32B 2264/105* (2013.01); *B32B 2307/702* (2013.01); *B32B 2307/704* (2013.01); *B32B 2307/746* (2013.01); *F16C 2204/52* (2013.01); *F16C 2204/60* (2013.01); *F16C 2240/60* (2013.01)

(58) Field of Classification Search
None
See application file for complete search history.

(56) References Cited

U.S. PATENT DOCUMENTS 6,607,820 B2 * 8/2003 Niwa ................. C08L 27/18
123/188.9
9,360,048 B2 * 6/2016 Iwata ................. F16C 33/128
(Continued)

FOREIGN PATENT DOCUMENTS

JP 2001-355634 12/2001
JP 2002-061653 2/2002
(Continued)

*Primary Examiner* — Daniel J Schleis
(74) *Attorney, Agent, or Firm* — Snyder, Clark, Lesch & Chung, LLP

(57) ABSTRACT

Provided is a sliding member having a steel back metal layer and a sliding layer. The sliding layer includes a resin composition and a porous sintered layer including Fe or Fe alloy phase particles and a Ni—P alloy phase functioning as a binder. The steel back metal layer is made of a carbon steel including 0.05 to 0.3 mass % carbon and includes a ferrite phase and a pearlite phase. A central portion in a thickness direction of the steel back metal layer includes not greater than 30 volume % of the pearlite phase. The steel back metal layer includes a high pearlite phase portion in its surface facing the sliding layer. The high pearlite phase portion includes not less than 50 volume % of the pearlite phase.

12 Claims, 4 Drawing Sheets

(51) Int. Cl.
*C22C 19/05* (2006.01)
*B32B 15/16* (2006.01)
*C22C 19/03* (2006.01)
*C22C 38/00* (2006.01)
*C23C 28/00* (2006.01)
*C23C 30/00* (2006.01)
*F16C 33/20* (2006.01)

(56) References Cited

U.S. PATENT DOCUMENTS 9,677,021 B2 * 6/2017 Iwata .................... B32B 15/043
2008/0226933 A1 * 9/2008 Bickle ................... F16C 33/201
428/545

FOREIGN PATENT DOCUMENTS

| JP | 2002-180162 | 6/2002 |
| JP | 2013-083304 | 5/2013 |
| JP | 2013-217493 | 10/2013 |
| JP | 2013-237898 | 11/2013 |

\* cited by examiner

SLIDING MEMBER

BACKGROUND OF THE INVENTION (1) Field of the Invention

The present invention relates to a sliding member including a sliding layer and a steel back metal, which has high corrosion resistance and high bonding strength between the sliding layer and the steel back metal.

(2) Description of Related Art

Sintered copper-based materials having a porosity of approximately 5 to 25% have been conventionally used for a sliding member for use in a fuel injection pump. The sliding member is cylindrically shaped and configured such that a fuel liquid is supplied from an outer peripheral surface side to an inner peripheral surface (sliding surface) side through pores existing in the sliding member, whereby a lubricating fluid film of the fuel liquid is formed on the inner peripheral surface (sliding surface) to support a shaft rotating at a high speed. Such sintered copper-based materials have a problem that the copper alloy is subject to corrosion due to organic acids or sulfur contained in the fuel and the fuel is contaminated by copper corrosion products. For the reason, sintered copper-based sliding materials including Ni, Al and Zn have been proposed to improve the corrosion resistance (see for example JP-A-2002-180162, JP-A-2013-217493 or JP-A-2013-237898).

Another type of sliding members have been conventionally used which are made of multi-layered sliding materials. The multi-layered sliding materials include a porous sintered layer made of a copper alloy disposed on a surface of a steel back metal via a copper plated layer, and pores and a surface of the porous sintered layer are impregnated and covered with a resin (see for example JP-A-2002-61653 or JP-A-2001-355634). It has been proposed to apply such multi-layered sliding materials to the sliding member of the fuel injection pump (see for example JP-A-2013-83304).

BRIEF SUMMARY OF THE INVENTION

Although the sintered copper-based sliding materials of JP-A-2002-180162, JP-A-2013-217493 and JP-A-2013-237898 have corrosion resistance by including Ni, Al and Zn, the corrosion of the copper alloy due to organic acids or sulfur contained in the fuel can not be completely prevented. Moreover, the sintered copper based sliding materials of these documents have a low strength since they include pores throughout the sliding member, and have an insufficient loading capability especially for a sliding member used for a common rail-type fuel injection pump as shown in JP-A-2013-83304 etc.

The multi-layered sliding materials of JP-A-2002-61653, JP-A-2001-355634 and JP-A-2013-83304 have a high strength since they include a steel back metal. However, a porous sintered layer composed of a copper alloy is subjected to the corrosion of the copper alloy by organic acids or sulfur contained in the fuel or lubricating oil. The sliding materials are produced by simply spreading and then sintering a carbon steel powder on a surface of a steel back metal to form a porous sintered layer without providing a copper-plated layer on the surface of the steel back metal like those of the above documents, and by impregnating and covering the porous sintered layer with a resin. For the sliding materials, it has been also revealed that the sliding materials have a lower bonding strength at an interface between the porous sintered layer and the resin in the sliding layer.

The present invention has been made in view of the above-described circumstances, and an object of the invention is to provide a sliding member having high corrosion resistance and high bonding strength between the sliding layer and the steel back metal.

In an aspect of the invention, there is provided a sliding member including:

a steel back metal layer; and a sliding layer on the steel back metal layer, the sliding layer including a porous sintered layer and a resin composition, the porous sintered layer including a Ni—P alloy phase and particles of an Fe or Fe alloy phase, the Ni—P alloy phase functioning as a binder for binding the particles of the Fe or Fe alloy phase with one another, or binding the particles of the Fe or Fe alloy phase with the steel back metal layer;

wherein the steel back metal layer is made of a carbon steel including 0.05 to 0.3 mass % carbon and has a structure consisting essentially of a ferrite phase and a pearlite phase;

wherein a volume ratio of the pearlite phase in the structure is not greater than 30% by volume at a central portion in a thickness direction of the steel back metal layer; and wherein the steel back metal layer has a high pearlite phase portion in a surface of 80 the steel back metal layer, which surface faces the sliding layer, the high pearlite phase portion including the pearlite phase in a volume ratio of at least 50% by volume of the structure.

The sliding member of the present invention may have increased bonding strength between the sliding layer and the steel back metal layer, since shearing at the interface between the sliding layer and the high pearlite phase portion of the steel back metal layer is less likely to occur when an external force is applied to and elastically deform the sliding member during operation of a bearing device.

Furthermore, the porous sintered layer in the sliding layer has high corrosion resistance against organic acids or sulfur since it includes a Ni—P alloy phase and Fe or Fe alloy phase particles.

In an embodiment, a volume ratio of the pearlite phase in the structure of the high pearlite phase portion may be at least twice the volume ratio of the pearlite phase in the structure of the central portion in a thickness direction of the steel back metal layer.

In an embodiment, the high pearlite phase portion may have an average thickness of 50 to 400 μm.

In an embodiment, the high pearlite phase portion may have a structure consisting essentially of a ferrite phase in a form of a network and a coarse pearlite phase surrounded by the network of the ferrite phase, and the coarse pearlite phase may have an average grain size at least three times greater than an average grain size of the pearlite phase in the structure of the central portion in a thickness direction of the steel back metal layer.

In an embodiment, an area ratio of the network of the ferrite phase may be at least 90% of a surface of the high pearlite phase portion facing the sliding layer.

In an embodiment, the network of the ferrite phase may have a thickness of not greater than 5 μm in the surface of the high pearlite phase portion facing the sliding layer.

In an embodiment, the Ni—P alloy phase may consist of 9 to 13 mass % P and the balance of Ni and inevitable impurities.

In an embodiment, the Ni—P alloy phase may consist of 9 to 13 mass % P, one or more selected from the group consisting of 1 to 4 mass % B, 1 to 12 mass % Si, 1 to 12 mass % Cr, 1 to 3 mass % Fe, 0.5 to 5 mass % Sn, and 0.5 to 5 mass % Cu; and the balance of Ni and inevitable impurities.

In an embodiment, a mass ration of the Ni—P alloy phase in the porous sintered layer may be 5 to 40 parts by mass in relation to 100 parts by mass of the porous sintered layer.

In an embodiment, the high pearlite phase portion may include alternately disposed thin regions and thick regions, the thick regions having a greater thickness than a thickness of the thin regions. With this configuration, shearing at the interface between the sliding layer and the high pearlite phase portion of the steel back metal layer is even less likely to occur when the sliding member is elastically deformed by an external force during the operation of a bearing device. Thus, a bonding strength between the sliding layer and the steel back metal layer can be further increased.

In an embodiment, the sliding member may have a cylindrical shape, such that the high pearlite phase portion includes the thin regions and the thick regions alternately disposed in a circumferential direction of the cylindrically shaped sliding member.

In an embodiment, the high pearlite phase portion may have an average thickness of 50 to 400 μm, and the thick regions may have a thickness not less than the average thickness while the thin regions may have a thickness not greater than the average thickness. In an embodiment, a difference between an average thickness of the thick regions and an average thickness of the thin regions may be at least 30% of the average thickness of the high pearlite phase portion. In an embodiment, an average distance between adjacent the thick regions in the circumferential direction of the cylindrically shaped sliding member may be 50 to 400 μm.

In an embodiment, an area ratio of the thick regions in relation to the whole surface of the high pearlite phase portion facing the sliding layer may be 20 to 50%.

Other objects, features and advantages of the invention will become apparent from the following description of non-limiting embodiments of the invention in reference with the accompanying drawings.

DETAILED DESCRIPTION OF THE INVENTION

Embodiment 1

Figure 1:
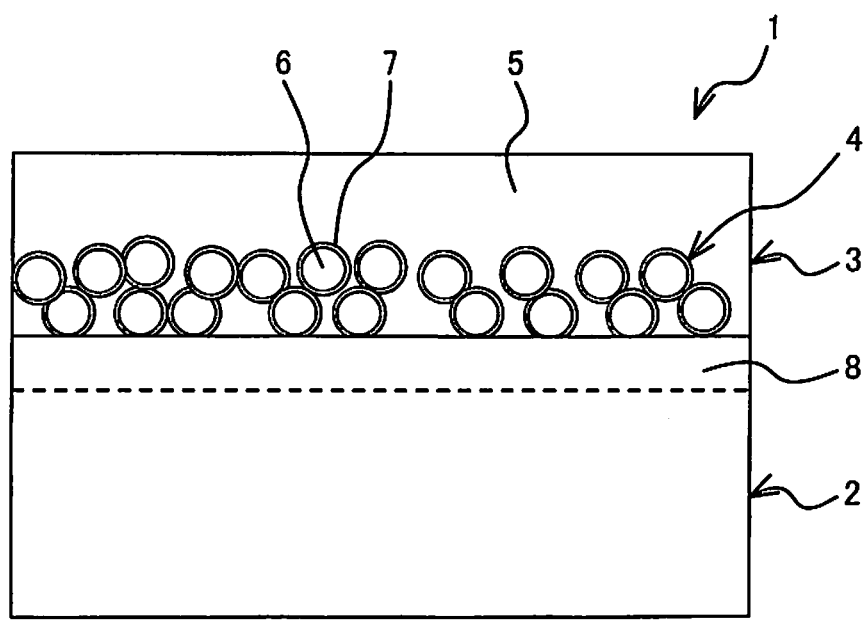
FIG. 1 is a schematic diagram showing a cross section of a sliding member according to an embodiment of the present invention where a high pearlite phase portion is formed in a surface of a steel back metal layer.
Figure 2:
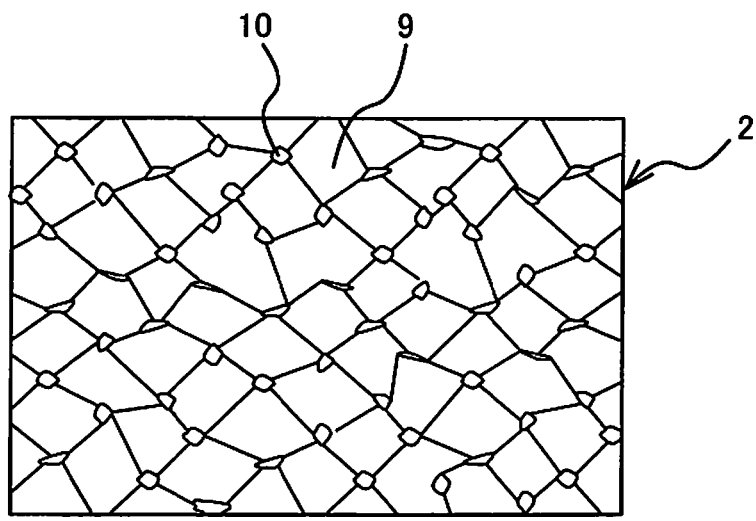
FIG. 2 is an enlarged view of FIG. 1, showing a structure in the vicinity of a central portion in a thickness direction of the steel back metal layer.
Figure 3:
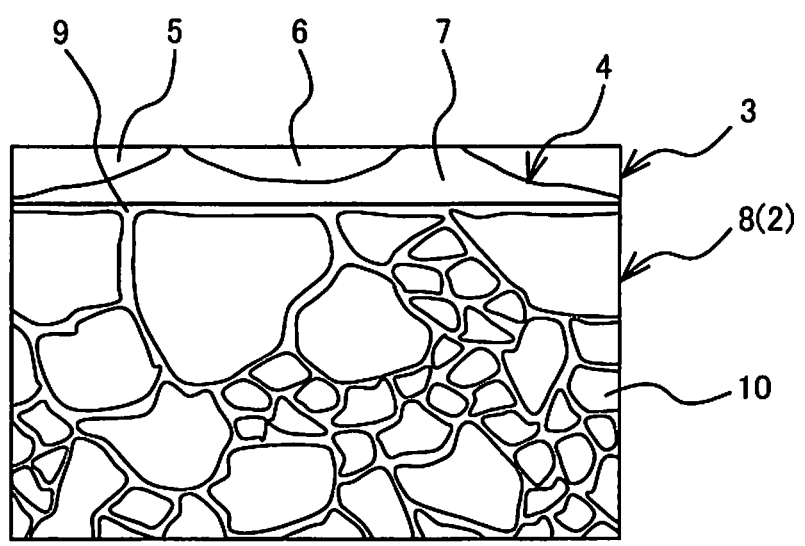
FIG. 3 is an enlarged view of FIG. 1, showing a structure of the high pearlite phase portion in the vicinity of a surface of the steel back metal layer.

Referring to FIGS. 1 to 3, a sliding member 1 according to an embodiment of the present invention where a high pearlite phase portion 8 is formed in a surface of a steel back metal layer 2 is described below. FIG. 1 is a schematic diagram showing a cross section of a sliding member 1 where a high pearlite phase portion 8 is formed in a surface of a steel back metal layer 2. FIG. 2 is an enlarged view of FIG. 1, showing a structure in the vicinity of a central portion in a thickness direction of the steel back metal layer 2, and FIG. 3 is an enlarged view of a structure of a high pearlite phase portion 8 in the vicinity of a surface of the steel back metal layer 2.

As shown in FIG. 1, the sliding member 1 includes the steel back metal layer 2 and the sliding layer 3. The sliding layer 3 on the steel back metal layer 2 includes a porous sintered layer 4 and a resin composition 5. The porous sintered layer 4 includes particles of an Fe or Fe alloy phase 6 and a Ni—P alloy phase 7. The Ni—P alloy phase 7 serves as a binder for binding particles of the Fe or Fe alloy phase 6 with one another or binding the particles of the Fe or Fe alloy phase 6 with a surface of the steel back metal layer 2. As shown in FIG. 1, the particles of the Fe or Fe alloy phase 6 are bonded to one another and the particles of the Fe or Fe alloy phase 6 and the surface of the steel back metal layer 2 are bonded to one another via the Ni—P alloy phase 7. Please note that the particles of the Fe or Fe alloy phase 6 may be bonded to one another partially by direct contact or sintering and/or the particles of the Fe or Fe alloy phase 6 and the surface of the steel back metal layer 2 may also be bonded to one another partially by direct contact or sintering. The particles of the Fe or Fe alloy phase 6 may have surface portions which are not covered with the Ni—P alloy phase 7. The porous sintered layer 4 includes pores to be impregnated with the resin composition 5, and the porosity thereof is 10 to 60%. More preferably, the porosity is 20 to 40%.

The steel back metal layer 2 is made of a carbon steel (hypoeutectoid steel) including 0.05 to 0.3 mass % carbon. If a carbon steel including less than 0.05 mass % carbon is used, the steel back metal layer 2 has a decreased strength and thus the strength of the sliding member 1 is insufficient. On the other hand, if a carbon steel including more than 0.3 mass % carbon is used, a large amount of free cementite phase (which is different from the lamellar cementite phase constituting a pearlite phase 10) will be formed in the high pearlite phase portion 8 of the steel back metal layer 2, which results in embrittlement of the steel back metal layer 2.

The steel back metal layer 2 has a structure composed of a ferrite phase 9 and a pearlite phase 10. The ferrite phase 9 in the steel back metal layer 2 has a low carbon content of not greater than 0.02 mass % and thus it has a composition close to a pure iron. On the other hand, the pearlite phase 10 in the steel back metal layer 2 has a lamellar structure in which the ferrite phase and a phase of cementite ($Fe_3C$), which is an iron carbide, are alternately disposed in a form of lamellae. The pearlite phase 10 has a higher carbon content than the ferrite phase 9. Thus, the steel back metal layer 2 has more increasing deformation resistance as a ratio of the pearlite phase 10 increases in the structure.

As shown in FIG. 2, a structure of the central portion in a thickness direction of the steel back metal layer 2 (which is a direction perpendicular to a surface of the steel back metal layer 2 facing the sliding layer 3) is mainly composed of a ferrite phase 9, while a volume ratio of the pearlite phase 10 in the structure is not greater than 30% by volume. This is a typical hypoeutectoid steel structure in which a ratio of the pearlite phase 10 is determined depending on a carbon content, and thus it does not has high deformation resistance while having high ductility. The steel back metal layer 2 having such a structure is preferable since it exhibits excellent formability in forming the sliding member 1 into a product such as a cylindrically shaped bearing and also since an outer peripheral surface (steel back metal layer 2) of the bearing can be placed in close contact with an inner peripheral surface of a bearing retaining hole 17 when the bearing is press fitted into a bearing retaining hole 17 of a bearing housing portion 16 (see FIG. 4).

In a vicinity of a surface of the steel back metal layer 2 facing the sliding layer 3, there is formed a high pearlite phase portion 8 as shown in FIG. 3, in which the pearlite phase 10 has a volume ratio of not less than 50% by volume of the structure. Thus, the steel back metal layer 2 has higher deformation resistance there than in the vicinity of the central portion in a thickness direction. Preferably, the volume ratio of the pearlite phase 10 in the structure of the high pearlite phase portion 8 of the steel back metal layer 2 is at least twice the volume ratio of the pearlite phase 10 in the central portion in a thickness direction of the steel back metal layer 2. The steel back metal layer 2, excluding the high pearlite phase portion 8, has substantially the same structure as the structure of the central portion.

The steel back metal layer 2 may have a composition consisting of the above-mentioned carbon content; one or more selected from the group consisting of at most 0.1 mass % Si, at most 1 mass % Mn, at most 0.04 mass % P, and at most 0.04 mass % S; and the balance of Fe and inevitable impurities. Although the structure of the steel back metal layer 2 is composed of the ferrite phase 9 and the pearlite phase 10, the structure is allowed to include fine precipitates (a phase of precipitates undetectable by microstructure observation at 1000-fold magnification using a scanning electron microscope).

In the embodiments, a cross-sectional structure of the sliding member 1 was observed in a direction parallel to a thickness direction with use of an electron microscope, and electron images of the vicinity of the central portion in a thickness direction of the steel back metal layer 2 and the vicinity of the surface of the steel back metal layer 2 facing the sliding layer 3 were observed at 500-fold magnification. Several (e.g., three) electron images were taken for each location. The images were analyzed with use of a typical image analysis method (analysis software: Image-Pro Plus (Version 4.5) from Planetron, Inc.) to measure the area ratio of the pearlite phase 10 in the structure. It was observed that a proportion (area ratio) of the pearlite phase 10 in the structure of the central portion in a thickness direction of the steel back metal layer 2 is not more than 30% and the proportion (area ratio) of the pearlite phase 10 in the structure of the vicinity of the surface of the steel back metal layer 2 facing the sliding layer 3 is not less than 50%. Thus, Formation of the high pearlite phase portion 8 in the surface of the steel back metal layer 2 can be confirmed. The area to be observed for determining the area ratio of the pearlite phase 10 in the vicinity of the central portion in a thickness direction of the steel back metal layer 2 may not strictly be the central position. The reason is because a region between the central position and the high pearlite phase portion 8 and a region between the central position and an opposite surface of the steel back metal layer 2 from the high pearlite phase portion 8 have substantially the same structure or has the same area ratio of the pearlite phase 10. Herein, the ratio of the pearlite phase 10 is represented as an area ratio in a cross section. However, the area ratio of the pearlite phase 10 has the same value as a volume ratio thereof.

The high pearlite phase portion 8 has a thickness of 50 to 400 μm from an interface with the sliding layer 3. More preferably, the thickness is 50 to 200 μm. Some steel back metal layers 2 for typical sliding members have a minimum thickness of 0.5 mm. When such a thin steel back metal layer 2 is used, the thickness of the high pearlite phase portion 8 should be limited to not more than 30% of the thickness of the steel back metal layer 2.

The surface of the high pearlite phase portion 8, which faces the sliding layer 3, includes Ni elements diffused from the Ni—P alloy phase 7 in the porous sintered layer 4. Although the amount of the diffused Ni elements in the high pearlite phase portion 8 is very small, the diffused Ni elements in the high pearlite phase portion 8 are observed by EPMA (electron probe microanalyzer) measurement. It is also seen that the concentration of the Ni elements decreases from the surface of the high pearlite phase portion 8 toward the inside.

As shown in FIG. 2, the vicinity of the central portion in a thickness direction of the steel back metal layer 2 has a structure of a typical hypoeutectoid steel where pearlite phase 10 grains are dispersed in a matrix of ferrite phase 9 grains. As shown in FIG. 3, the high pearlite phase portion 8 has a structure composed of a ferrite phase 9 network and coarse pearlite phase 10 grains surrounded by the ferrite phase 9 network. Preferably, the coarse pearlite phase 10 grains in the high pearlite phase portion 8 have an average grain size of at least three times greater than an average grain size of the pearlite phase 10 grains in the structure of the vicinity of the central portion of the steel back metal layer 2 so that the high pearlite phase portion 8 and the vicinity of the central portion have largely different deformation resistances therebetween.

As a method for determining the average grain sizes of the pearlite phase 10 in the central portion and the high pearlite phase portion 8 is as follows. Images are taken by the above-described method and analyzed with use of a typical image analyzing technique (analysis software: Image-Pro Plus (Version 4.5) from Planetron, Inc.) to measure an area of each pearlite phase 10 grain and then the area is convert into an average diameter by assuming that the grain is circular.

As shown in FIG. 3, the high pearlite phase portion 8 has a surface facing the sliding layer 3, major area of which is composed of the ferrite phase 9 network, and thus it results in a high bonding strength with the porous sintered layer 4 and the resin composition 5 of the sliding layer 3. Since the pearlite phase 10 includes cementite ($Fe_3C$) which is an iron carbide, the bonding strength of the pearlite phase 10 with the porous sintered layer 4 and the resin composition 5 is smaller than the ferrite phase 9. It is preferable to make the area ratio of the ferrite phase 9 network in the surface of the high pearlite phase portion 8 be at least 90% in order to increase the bonding strength between the steel back metal layer 2 and the sliding layer 3.

A thickness of the ferrite phase 9 network in the high pearlite phase portion 8 in the interface with the sliding layer 3 is preferably not greater than 5 μm. If the thickness of the ferrite phase 9 network is greater than 5 μm, a volume ratio of the ferrite phase 9 is increased and a volume ratio of the pearlite phase 10 is decreased in the structure of the high pearlite phase portion 8. This results in that the high pearlite phase portion 8 has decreased deformation resistance.

The area ratio of the ferrite phase 9 in the high pearlite phase portion 8 in the interface with the sliding layer 3 can not be directly measured. However, it can be determined by analyzing images taken by the above-described method using the typical image analyzing technique (analysis software: Image-Pro Plus (Version 4.5) from Planetron, Inc.) and measuring a ratio of a length of the ferrite phase 9 to a total length of a line defining the interface with the sliding layer 3 in the image.

The Ni—P alloy phase has a composition consisting of 9 to 13 mass % P and the balance of Ni and inevitable impurities. For the composition of the Ni—P alloy phase 7, a melting point of the Ni—P alloy is lowered. More desirably, the composition of the Ni—P alloy phase 7 consists of 10 to 12 mass % P and the balance of Ni and inevitable impurities.

In a heating process for sintering the porous layer 4 on the steel back metal layer 2, it is necessary, as described later, to heat to a temperature at which the ferrite phase 9 and the pearlite phase 10 of the steel back metal layer 2 transform into an austenite phase. At the temperature at which the structure of the steel back metal layer 2 is sufficiently transformed into the austenite phase, the Ni—P alloy phase 7 having the above described composition melt into a liquid phase, and thus the Ni—P alloy phase 7 acts as a binder for binding the Fe or Fe alloy phase 6 particles with one another or binding the Fe or Fe alloy phase 6 particles with the surface of the steel back metal layer 2. Thus, the porous sintered layer 4 composed of the of Fe or Fe alloy phase 6 particles and the Ni—P alloy phase 7 is formed on the steel back metal layer 2.

In a cooling process after sintering, a cooling rate of the surface of the steel back metal layer 2 facing the porous sintered layer 4 is increased to form the high pearlite phase portion 8. If the Ni—P alloy phase 7 includes less than 9 mass % or more than 13 mass % of P, the Ni—P alloy phase 7 has a higher melting point and thus the sintering temperature needs to be raised. Since the composition is set in the above range, the melting point of the Ni—P alloy is lowered and there is no need to raise the sintering temperature excessively. Therefore, the cooling rate after sintering can be set such that the high pearlite phase portion 8 can be formed.

For adjustment of the strength of the Ni—P alloy phase 7, the Ni—P alloy phase 7 may further include optionally one or more selected from the group consisting of 1 to 4 mass % B, 1 to 12 mass % Si, 1 to 12 mass % Cr, 1 to 3 mass % Fe, 0.5 to 5 mass % Sn, and 0.5 to 5 mass % Cu. Among the optional elements, the Cu content needs to be limited to not more than 5% by mass in order to avoid influence on corrosion resistance of the Ni—P alloy phase 7. Furthermore, the Ni—P alloy phase 7 including the optional components preferably has a structure where an essential element P and the optional elements B, Si, Cr, Fe, Sn and Cu are solid-solute in a Ni matrix. However, the Ni matrix may include secondary phases of the elements (precipitates or crystallized substances).

The proportion of the Ni—P alloy phase 7 in the porous sintered layer 4 is set such that the Ni—P alloy phase 7 is 5 to 40 parts by mass, and more preferably 10 to 20 parts by mass, in relation to 100 parts by mass of the porous sintered layer 4. The proportion of the Ni—P alloy phase 7 is set in a suitable range that allows the Ni—P alloy phase 7 to act as a binder for binding the of the Fe or Fe alloy phase 6 particles with one another or binding the of the Fe or Fe alloy phase 6 particles with the surface of the steel back metal layer 2 so as to form the porous sintered layer 4 on the surface of the steel back metal layer 2. If the proportion of the Ni—P alloy phase 7 is less than 5 parts by mass, the porous sintered layer 4 has an insufficient strength and the bonding strength between the porous sintered layer 4 and the steel back metal layer 2 become insufficient. On the other hand, if the proportion of the Ni—P alloy phase 7 is more than 40 parts by mass, the porous sintered layer 4 has an excessively low porosity since the Ni—P alloy fills the portions to become pores during sintering.

An average size of the Fe or Fe alloy phase 6 particles in the porous sintered layer 4 may be 45 to 180 μm. Please note that a composition of the Fe alloy is not limited. Commercially available particles such as pure iron, hypoeutectoid steel, eutectoid steel, hypereutectoid steel, cast iron, high speed steel, tool steel, austenitic stainless steel, ferritic stainless steel or the like, may be employed. Whichever Fe alloy is employed, it has more improved corrosion resistance against organic acids or sulfur than a conventional copper alloy. The Fe or Fe alloy phase 6 particles in the porous sintered layer 4 may include a reaction phase, resulting from reaction with components of the Ni—P alloy phase 7, on the surface facing the Ni—P alloy phase 7.

A resin composition 5 is impregnated in the pores and coated on a surface of the porous sintered layer 4. A typical resin for sliding members may be used as the resin composition 5. Specifically, the resin composition may include one or more of fluororesin, polyetheretherketone, polyamide, polyimide, polyamide-imide, polybenzimidazole, epoxy, phenol, polyacetal, polyethylene, polypropylene, polyolefin, and polyphenylene sulfide, and further include, as a solid lubricant, one or more of graphite, graphene, graphite fluoride, molybdenum disulfide, fluororesin, polyethylene, polyolefin, boron nitride, and tin disulfide. One or more of granular or fibrous metal, metal compound, ceramic, inorganic compound, or organic compound may be incorporated as a filler into the resin composition 5. However, the resin, the solid lubricant, and the filler, which constitute the resin composition 5, are not limited to the above examples described here.

Figure 4:
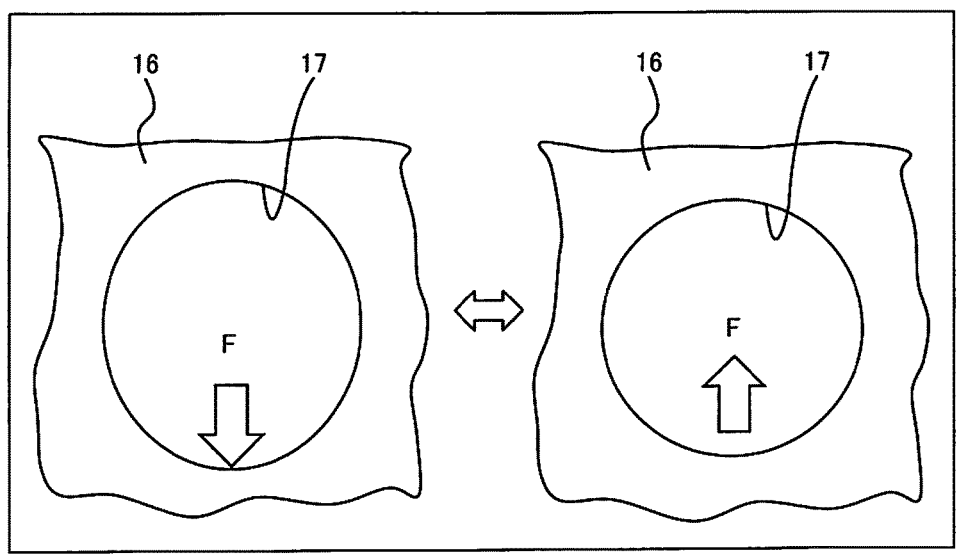
FIG. 4 is an illustration for explaining deformation of a bearing retaining hole of a bearing housing.
Figure 7:
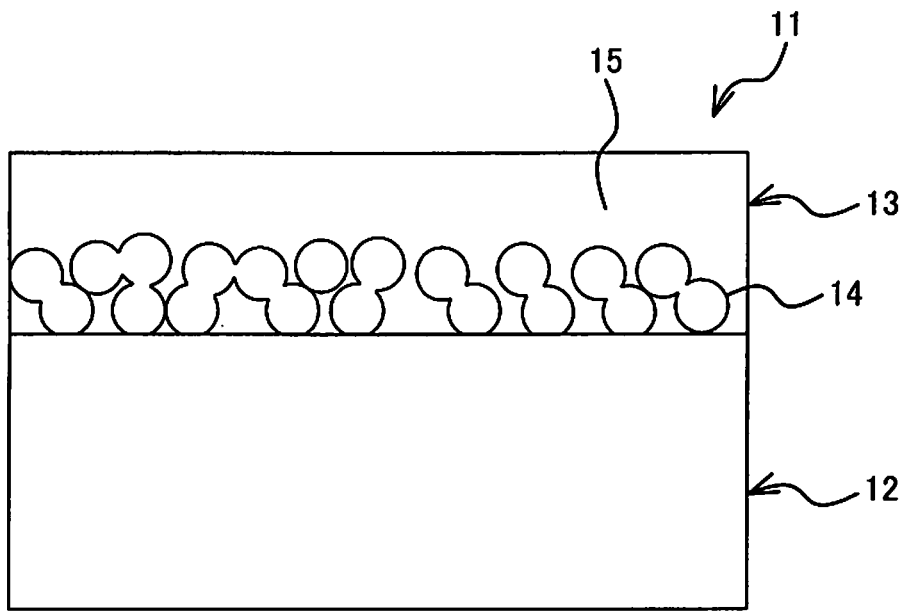
FIG. 7 is a schematic diagram showing a conventional sliding member.

Next, referring to FIGS. 4 and 7, a bonding between a sliding layer 13 made of a porous sintered layer 14 and a resin composition 15 and a steel back metal layer 12 in a conventional sliding member 11 is described. FIG. 4 is an illustration for explaining deformation of an inner diameter of a bearing retaining hole 17 of a bearing housing 16 of a bearing device where the sliding member 11 is employed as the bearing. FIG. 7 is a schematic diagram of the sliding member 11 including the sliding layer 13 made of the porous sintered layer 14 and the resin composition 15 on the conventional steel back metal layer 12.

Bearing devices support dynamic loads (variable loads) from a rotating shaft, such as a fuel injection pump, and are configured such that a cylindrically shaped bearing (sliding member 11) is press fitted into an inner surface of a cylindrically shaped bearing retaining hole 17 of a bearing housing 16 and an inner peripheral surface (sliding surface) of the bearing supports the rotating shaft. In recent years, the bearing device has been weight-saved and thus a stiffness of the bearing housing 16 has been reduced. Thus, an inner diameter of the bearing retaining hole 17 undergoes elastic deformation each time the dynamic loads are applied from the rotating shaft changes its direction (arrow F) during operation of the bearing device, as shown in FIG. 4. Due to the elastic deformation of the bearing retaining hole 17, the bearing (not shown in FIG. 4) undergoes repeated deformation and thus a circumferential length increases and decreases alternately and periodically.

As shown in FIG. 7, the sliding member 11 includes the sliding layer 13 made of the porous sintered layer 14 and the resin composition 15 on the conventional steel back metal layer 12. The steel back metal layer 12 has a structure of a typical hypoeutectoid steel (corresponding to the structure shown in FIG. 2), which includes, in the entire thickness direction, a ferrite phase as the main phase and a granular pearlite phase dispersed in the ferrite phase matrix. The steel back metal layer 12 having such a structure does not have a high deformation resistance against external forces, and the deformation resistance is substantially uniform in a thickness direction of the steel back metal layer 12. When the conventional sliding member 11 is used in the bearing device shown in FIG. 4, the elastic deformation for increasing and reducing the circumferential length occurs first at a surface (an outer peripheral surface) of the steel back metal layer 12, which directly contacts the inner peripheral surface of the bearing retaining hole 17. Then, the deformation propagates toward the inside in a thickness direction of the steel back metal layer 12 and further propagates to the porous sintered layer 14 which contacts the surface of the steel back metal layer 12. Shear stress tends to generate due to difference in the elastic deformation factor between the steel back metal layer 12 and the porous sintered layer 14 at an interface therebetween, and therefore shear between the steel back metal layer 12 and the sliding layer 13 is likely to occur.

In the sliding member 1 according to the embodiments of the present invention, the steel back metal layer 2 is made of a carbon steel including 0.05 to 0.3 mass % carbon and has a structure of a typical hypoeutectoid steel consisting essentially of the ferrite phase 9 and the pearlite phase 10 wherein a volume ratio of the pearlite phase 10 is not greater than 30% by volume of the structure in the central portion in a thickness direction of the steel back metal layer 2 and a proportion of the pearlite phase 10 is determined depending on the carbon content. However, the high pearlite phase portion 8 including the pearlite phase 10 by a volume ratio of at least 50% by volume of the structure is formed in a surface of the steel back metal layer 2 facing the sliding layer 3, so that a deformation resistance is increased compared with the vicinity of the central portion of the steel back metal layer 2. Thus, even if the elastic deformation for increasing and decreasing the circumferential length of the sliding member 1 may occur due to the elastic deformation of the inner diameter of the bearing retaining hole 17 of the bearing housing 16, the elastic deformation occurs mainly in regions excluding the high pearlite phase portion 8. Therefore, an amount of elastic deformation is small in the high pearlite phase portion 8. In other words, the elastic deformation of the surface (outer peripheral surface) of the steel back metal layer 2 which contacts the inner peripheral surface of the bearing retaining hole 17 propagates in a thickness direction of the steel back metal layer 2 reaching near the high pearlite phase portion 8. However, it is less likely to propagate to the inside of the high pearlite phase portion 8, which has high deformation resistance. In addition, an amount of elastic deformation of the steel back metal layer 2 excluding the high pearlite phase portion 8 increases, while an amount of elastic deformation of the high pearlite phase portion 8 is reduced. Thus, shear stress is decreased at the interface between the steel back metal layer 2 and the porous sintered layer 4.

If a steel back metal layer 2 is made of for example, an alloy steel or the like having high deformation resistance comparable to that of the high pearlite phase portion 8 through the entire thickness direction, the elastic deformation occurs in a uniform manner through the entire thickness direction of the steel back metal layer. Therefore, the amount of elastic deformation in the surface of the steel back metal layer which forms the interface with the sliding layer is greater than that of the embodiments, and greater shear stress is generated at the interface between the steel back metal layer and the sliding layer.

Embodiment 2

Figure 5:
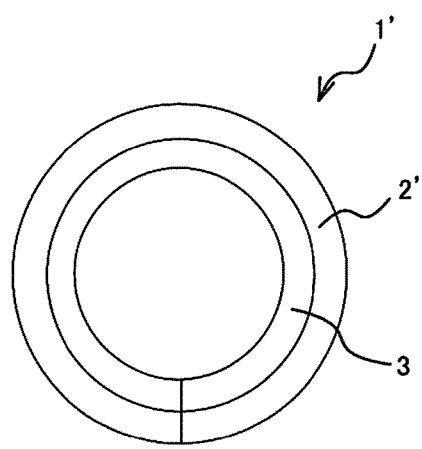
FIG. 5 is a front view of a cylindrically shaped sliding member according to further embodiment of the present invention where a sliding layer is formed on a surface of a steel back metal layer.
Figure 6:
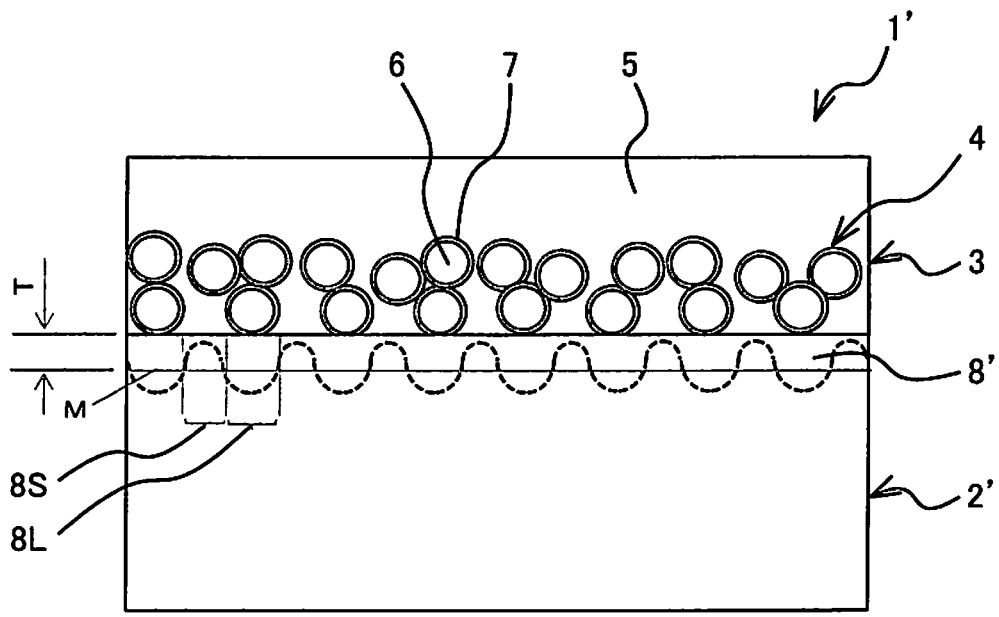
FIG. 6 is a schematic diagram showing a circumferential cross section of a cylindrically shaped sliding member according to further embodiment of the present invention where a high pearlite phase portion is formed in a surface of a steel back metal layer.

Next, referring to FIGS. 5 and 6, a sliding member 1' according to another embodiment of the present invention, in which a high pearlite phase portion 8' is formed in a surface of a steel back metal layer 2', is described below. FIG. 5 is a front view of a cylindrically shaped sliding member 1' including a steel back metal layer 2' and a sliding layer 3. FIG. 6 is a schematic diagram showing a circumferential cross section of plane-extended cylindrical sliding member 1' including a high pearlite phase portion 8' formed in a surface of the steel back metal layer 2'.

As shown in FIG. 6, the high pearlite phase portion 8' is formed in a surface of the steel back metal layer 2' facing the porous sintered layer 4 of the sliding layer 3. A thicknesses of the high pearlite phase portion 8' varies such that the thickness repetitively increases and decreases in a circumferential direction of the cylindrically shaped sliding member 1'. Thus, thin regions 8S having reduced thicknesses and thick regions 8L having increased thicknesses are alternately formed. Among the Fe or Fe alloy phase 6 particles stacked on a surface of the steel back metal layer 2', the Fe or Fe alloy phase 6 particles closed to the surface of the steel back metal layer 2' are mainly positioned on the thick regions 8L. In other words, the thick regions 8L are formed from the surface of the steel back metal layer 2' close to the Fe or Fe alloy phase 6 particles of the porous sintered layer 4 toward the inside of the steel back metal layer 2' in a radial manner. Although not shown, the thickness of the high pearlite phase portion 8' is also varied in an axial direction of the cylindrically shaped sliding member 1' so as to repetitively increase and decrease.

The sliding layer 3 is similar to that of Embodiment 1 as described above. The composition and the structures of the steel back metal layer 2', the structures of the high pearlite phase portion 8', and the observation method are also as described in Embodiment 1. Thus, the structures can be observed in cross-section of a circumferential direction of the sliding member 1' taken in a direction parallel to the thickness direction with use of an electron microscope.

The high pearlite phase portion 8' has an average thickness of 50 to 400 μm from the interface with the sliding layer 3. Preferably, the average thickness of the high pearlite phase portion 8' is 50 to 200 μm. In general, some steel back metal layer 2' for typical sliding members has a minimum thickness of 0.5 mm. When such a thin steel back metal layer 2' is used, the thickness of the high pearlite phase portion 8' should be limited to not more than 30% of the thickness of the steel back metal layer 2'.

When the high pearlite phase portion 8' is divided into the thick regions 8L and the thin regions 8S wherein the thick regions 8L is defined as having a thickness greater than or equal to an average thickness of the high pearlite phase portion 8' and the thin regions 8S is defined as having a thickness smaller than the average thickness of the high pearlite phase portion 8', difference between an average thickness of the thick regions 8L and the average thickness of the thin regions 8S is preferably not less than 30% of the average thickness of the high pearlite phase portion 8'. Furthermore, an average length between adjacent thick regions 8L (i.e., an average length of the thin regions 8S) in the circumferential direction of the cylindrically shaped sliding member 1' is preferably 50 to 400 µm. Please note that the average length between adjacent thick regions 8L is indicated by a circumferential length on the surface of the steel back metal layer 2' facing the sliding layer 3. Furthermore, an area ratio of the thick regions 8L on the surface of the high pearlite phase portion 8' facing the sliding layer 3 is desirably 20 to 50%.

The method for dividing the high pearlite phase portion 8' into the thick regions 8L and the thin regions 8S is explained below. First, images are taken by the method as explained in Embodiment 1 with 200-fold magnification and are analyzed with use of a typical image analyzing technique (analysis software: Image-Pro Plus (Version 4.5) from Planetron, Inc.) to determine the average thickness of the high pearlite phase portion 8' from the surface of the steel back metal layer 2'. Next, an imaginary line M is drawn parallel to the surface of the steel back metal layer 2' such that the imaginary line M is spaced from the surface of the steel back metal layer 2' by a value T of the average thickness of the high pearlite phase portion 8'. Then, imaginary perpendicular lines are drawn such that they extend toward the surface of the steel back metal layer 2' from an intersections between the parallel imaginary line M and a borderline of the high pearlite phase portion 8' (that is a boundary between the high pearlite phase portion 8' and the other region than the high pearlite phase portion 8', shown as a dashed line in FIG. 6). When regions of the high pearlite phase portion 8' interposed between adjacent imaginary perpendicular lines do not reach the parallel imaginary line M, they are determined to be thin regions 8S. Other regions are determined to be thick regions 8L (see FIG. 2). For each of the thick regions 8L and the thin regions 8S, an average thickness of the high pearlite phase portion 8' therein is measured by the above image analyzing technique. Thus, it is confirmed that a difference of the average thickness between the thick regions 8L and the thin regions 8S is not less than 30% of the average thickness of the entire high pearlite phase portion 8'. An average length between adjacent thick regions 8L, which is indicated by a length of the surface of the steel back metal layer 2', can be determined by measuring lengths between every two adjacent imaginary perpendicular lines defining the thick region 8L and the measured values of the lengths are averaged. Although an area ratio of the thick regions 8L on the surface of the steel back metal layer 2' facing the sliding layer 3 can not be directly measured, it can be determined by measuring the ratio of the length of the thick regions 8L to the total length of the line defining the interface between the high pearlite phase portion 8' and the sliding layer 3 in the images, using the above image analyzing technique.

As similarly to Embodiment 1, the sliding member 1' according to Embodiment 2 has increased deformation resistance as compared with the vicinity of the central portion of the steel back metal layer 2', by forming the high pearlite phase portion 8'. Thus, even if an elastic deformation may occur so that a circumferential length of the sliding member 1' increases and decreases due to the elastic deformation of an inner diameter of a bearing retaining hole 17 of a bearing housing 16, the elastic deformation mainly occurs in regions excluding the high pearlite phase portion 8', while the deformation is small in the high pearlite phase portion 8'. Furthermore, since the thickness of the high pearlite phase portion 8' is varied so as to repetitively increase and decrease in the circumferential direction of the sliding member 1', an amount of elastic deformation in the thin regions 8S having reduced thicknesses of the high pearlite phase portion 8' is increased, whereby an amount of elastic deformation is reduced in the thick regions 8L having increased thicknesses of the high pearlite phase portion 8', which the Fe or Fe alloy phase 6 particles of the porous sintered layer 4 are mainly close to or in contact with. As a result, shear stress is decreased at an interface between the steel back metal layer 2' and the porous sintered layer 4.

In addition, since (i) the average thickness of the high pearlite phase portion 8' is 50 to 400 µm from the interface with the sliding layer 3; (ii) the difference of the average thickness of the high pearlite phase portion 8' between the thick regions 8L and the thin regions 8S is made to be not less than 30% of the average thickness of the high pearlite phase portion 8'; and (iii) the average length between adjacent thick regions 8L (i.e., the average length of the thin regions 8S) in the circumferential direction (when viewed in circumferential cross section) of the cylindrically shaped sliding member 1' is made to be 50 to 400 µm, shear stress is further decreased at the interface between the steel back metal layer 2' and the porous sintered layer 4. Furthermore, since the area ratio of the thick regions 8L of the high pearlite phase portion 8' on the surface of the steel back metal layer 2' facing the sliding layer 3 is made to be 20 to 50%, the shear stress is further decreased at the interface between the steel back metal layer 2' and the porous sintered layer 4.

In the embodiment, the description has been made of an example of the cylindrically shaped sliding member 1' having the high pearlite phase portion 8' composed of alternately disposed thin regions 8S and thick regions 8L. However, it will be apparent that planar sliding members having the high pearlite phase portion 8' composed of are alternately disposed thin regions 8S and thick regions 8L can be also used.

Producing Process

Next, a process for producing the sliding members 1, 1' according to the present embodiments is described. First, a mixed powder of an Fe or Fe alloy powder and a Ni—P alloy powder is prepared. For the Ni—P alloy powder, a mixture of two or more powders having different compositions may be used in place of the Ni—P alloy powder as far as the mixture totally have the composition of the Ni—P alloy phase of the porous sintered layer 4, while the use of sole Ni—P alloy powder is preferable. The prepared mixed powder is spread on a metal sheet at a room temperature and then subjected to sintering in a sintering furnace in a reducing atmosphere at 930 to 1000° C. without application of pressure to the spread powder. For producing the sliding member 1' of Embodiment 2, the mixed powder is spread on a steel sheet in such a manner that the powders of Fe or Fe alloy are spaced apart from one another at an interval of 0.2 to 1 mm.

If the Ni—P alloy has a composition including 9 to 13 mass % P and the balance of Ni, it starts to melt when a temperature reaches 880° C. in a heating process of sintering. The liquid flows between the Fe or Fe alloy particles and between the Fe or Fe alloy particles and the surface of the steel back metal layer 2, and the porous sintered layer formation stars. At 950° C., the Ni—P alloy particles completely melt in a liquid phase.

In a case where the Ni—P alloy includes 10 to 12 mass % of P and the balance of Ni, it melts completely at 930° C.

The sintering temperature is set such that the Ni—P alloy completely melt at the temperature. As described later, the composition of the Ni—P alloy is determined such that the alloy completely melts at a temperature equal to or higher than a temperature (A3 transformation point) at which the steel back metal layer 2 completely transforms into an austenite phase.

The steel back metal layer 2 having the structure composed of the ferrite phase and the pearlite phase starts to transform into an austenite phase at 727° C. (A1 transformation point) in the heating process of sintering. In particular, a steel back metal layer including 0.05 to 0.3 mass % carbon completely transforms in the austenite phase at 900° C. Since a spacing (distance) between Fe atoms in the austenite phase is greater than that in the ferrite phase, Ni atoms of the Ni—P alloy phase in the porous sintered layer 4 are more likely to interstitially diffuse into the spaces. As described above, the composition of the Ni—P alloy is determined such that the Ni—P alloy completely melts at a temperature equal to or higher than the temperature (A3 transformation point) at which the structure of the steel back metal layer completely transforms into the austenite phase, and the sintering temperature is set to a temperature equal to or higher than the temperature at which the particles of Ni—P alloy melt completely. Thus, it is more easily in the liquid phase state than in the solid phase state that Ni atoms in the Ni—P alloy phase are diffused into the austenite phase in the surface of the steel back metal layer. When the Ni atoms in the liquid phase state are diffused into the austenite phase in the surface of the steel back metal layer, they solid-solute in a solid phase, and therefore the Ni atoms are diffused only in a region very close to the surface of the steel back metal layer. As a result of the diffusion of Ni atoms into the surface of the steel back metal layer in the heating process of sintering, the diffusion of Ni atoms facilitates transformation into the austenite phase near the surface of the steel back metal layer than in the inner structure. It is considered that, by the reason, the austenite phase grains near the surface grow coarse compared with those in the inner region. The diffusion of Ni atoms into the austenite phase in the surface of the steel back metal layer 2 and the coarsening of grains of the austenite phase are related to the formation of the high pearlite phase portion 8 in the surface of the steel back metal layer in the cooling process described later.

In the case of Embodiment 2, a larger amount of the Ni—P alloy phase in a liquid phase state flows into the spaces between and the surface of the steel back metal layer and the surfaces of the Fe or Fe alloy particles that are disposed apart from one another on the surface of the steel back metal layer. Therefore, it is believed that grains of the austenite phase near the surface of the steel back metal layer, which the particles of the Fe or Fe alloy are close to or in contact with, grow coarse in particular.

In a temperature range from 900° C. to 700° C. during a cooling process after sintering, it is necessary to make a cooling rate different between a surface of the steel back metal layer on a side where the porous sintered layer is formed (the side interfacing with the porous sintered layer 4) and a surface on an opposite side where the porous sintered layer is not formed. The surface of the steel back metal layer on the side where the porous sintered layer is formed is rapidly cooled so as to obtain a structure, at 700° C., composed of a main austenite phase and small amount of pro-eutectoid ferrite phase that precipitates in a network form along a grain boundaries of the austenite phase, since the cooling rate prevents precipitation of large amounts of pro-eutectoid ferrite phase from the austenite phase during lowering to 727° C. (A1 transformation point), or prevents eutectoid transformation of the austenite phase into the ferrite phase and the pearlite phase at 727° C. (A1 transformation point). As described above, the Ni atoms of the Ni—P alloy phase in a liquid phase in the heating process are diffused into the austenite phase in the surface of the steel back metal layer on the side where the porous sintered layer is formed, in particular near the surface of the steel back metal layer which the particles of the Fe or Fe alloy of the porous sintered layer 4 are close to or in contact with. Thus, the austenite phase is stabilized by the inclusion of the Ni atoms, which results in that the occurrence of eutectoid transformation into the ferrite phase and the pearlite phase at 727° C. (A1 transformation point) in the cooling process is less likely occur. Therefore, it is easy to retain the austenite phase at 700° C. in the surface of the steel back metal layer on the side where the porous sintered layer is formed. On the other hand, the surface of the steel back metal layer on the side where the porous sintered layer is not formed is cooled at a rate that enables complete transformation of the austenite phase into the ferrite phase and the pearlite phase at 727° C. (A1 transformation point). An inside of the steel back metal layer is cooled at a cooling rate slower than that of the surface of the steel back metal layer on the side where the porous sintered layer is not formed, and therefore the austenite phase transforms into the ferrite phase and the pearlite phase completely at 727° C. (A1 transformation point).

As a specific cooling method, a jet stream of a cooling gas such as a nitrogen gas is directly blasted (e.g., with an blasting pressure of at least 1 MPa on the surface of the porous sintered layer) for rapid cooling only of the surface of the steel back metal layer on the side where the porous sintered layer is formed, whereas the opposite surface of the steel back metal layer is not subjected to the direct blasting of the cooling gas but may be slowly cooled only by heat exchange with an atmosphere (such as the cooling gas after blasted onto the surface of the steel back metal layer on the side where the porous sintered layer is formed) in a cooling system. During lowering the steel back metal layer from 700° C. to a room temperature, it may be slowly cooled at a cooling rate that enables transformation of the austenite phase into the pearlite phase in the surface of the steel back metal layer on the side where the porous sintered layer is formed. The structures, such as a proportion of the pearlite phase 10 and an average grain size of the pearlite phase 10, of a region near the surface of the steel back metal layer on the side where the porous sintered layer is not formed and of the inside of the steel back metal layer are dependent on the eutectoid transformation at 727° C. (A1 transformation point) and are not affected by the cooling rate from 700° C. to a room temperature.

The cooling rate and the cooling time for transforming the austenite phase in the cooling process are determined in reference to CCT diagrams (continuous cooling transformation diagrams) and TTT diagrams (time-temperature-transformation diagrams) for a hypoeutectoid steel.

From the above mechanism, a structure of the inside of the steel back metal layer is made as a typical structure composed of the ferrite phase and the pearlite phase (typical hypoeutectoid steel structure in which a proportion of the pearlite phase is determined by a carbon content), with an average grain size of the pearlite phase being about 1 to 8 μm. In contrast, the surface of the steel back metal layer interfacing with the sliding layer has a high pearlite phase portion in which the pearlite phase is formed with a volume ratio of not less than 50% by volume of the structure. In particular according to the Embodiment 2, the high pearlite phase portion is formed to have varied thicknesses such that the thickness repetitively increases and decreases in a direction parallel to the surface of the steel back metal layer. Furthermore, the high pearlite phase portion consequently has a structure composed of a network of the ferrite phase and a coarsely grained pearlite phase surrounded by the ferrite phase network. In particular, the surface of the high pearlite phase portion interfacing with the sliding layer is substantially formed of the ferrite phase network. In addition, an average grain size of the coarsely grained pearlite phase is 10 to 50 μm, and it is preferably at least three times greater than the average grain size of the pearlite phase in the inside of the steel back metal layer. The high pearlite phase portion may include a small amount (not more than 3% in the structure) of bainite phase, sorbite phase, troostite phase, martensite phase, cementite phase and austenite phase.

The member including the porous sintered layer on the surface of the steel back metal layer as described above is impregnated with a previously prepared resin composition which may have been diluted with an organic solvent, so that pores of the porous sintered layer are filled and a surface of the porous sintered layer is coated with the resin. The member is subjected to heating for drying and baking the resin, so that the sliding layer 3 composed of the porous sintered layer 4 and the resin composition 5 is formed on the surface of the steel back metal layer. In a case of producing a cylindrically shaped sliding member, a planar sliding member produced in the above-described manner is formed into a cylindrical shape such that the sliding layer constitutes an inner peripheral surface and the steel back metal layer constitutes an outer peripheral surface as shown in FIG. 5, whereby a cylindrically shaped sliding member is produced.

The invention claimed is:

1. A sliding member comprising:
    a steel back metal layer; and
    a sliding layer on the steel back metal layer, the sliding layer including a porous sintered layer and a resin composition, the porous sintered layer including a Ni—P alloy phase and particles of an Fe or Fe alloy phase, the Ni—P alloy phase functioning as a binder for binding the Fe or Fe alloy phase particles with one another or binding the Fe or Fe alloy phase particles with the steel back metal layer;
    wherein the steel back metal layer is made of a carbon steel including 0.05 to 0.3 mass % carbon and has a structure consisting essentially of a ferrite phase and a pearlite phase;
    wherein a central portion in a thickness direction of the steel back metal layer includes not greater than 30 volume % of the pearlite phase; and
    wherein the steel back metal layer includes a high pearlite phase portion in a surface of the steel back metal layer facing the sliding layer, the high pearlite phase portion including not less than 50 volume % of the pearlite phase.

2. The sliding member according to claim 1, wherein a volume ratio of the pearlite phase in the high pearlite phase portion is at least twice the volume ratio of the pearlite phase in the central portion in the thickness direction of the steel back metal layer.

3. The sliding member according to claim 1, wherein the high pearlite phase portion has an average thickness of 50 to 400 μm.

4. The sliding member according to claim 1, wherein the high pearlite phase portion has a structure consisting essentially of a ferrite phase in a form of a network and a coarse pearlite phase surrounded by the ferrite phase network, the coarse pearlite phase having an average grain size at least three times greater than an average grain size of the pearlite phase in the central portion in the thickness direction of the steel back metal layer.

5. The sliding member according to claim 4, wherein an area ratio of the ferrite phase network is at least 90% of a surface of the high pearlite phase portion facing the sliding layer.

6. The sliding member according to claim 4, wherein the ferrite phase network has a thickness of not greater than 5 μm in the surface of the high pearlite phase portion facing the sliding layer.

7. The sliding member according to claim 1, wherein the Ni—P alloy phase consists of:
    9 to 13 mass % P;
    optionally one or more selected from the group consisting of 1 to 4 mass % B, 1 to 12 mass % Si, 1 to 12 mass % Cr, 1 to 3 mass % Fe, 0.5 to 5 mass % Sn, and 0.5 to 5 mass % Cu; and
    the balance of Ni and inevitable impurities.

8. The sliding member according to claim 1, wherein a mass ratio of the Ni—P alloy phase in the porous sintered layer is 5 to 40 parts in relation to 100 parts of the porous sintered layer.

9. The sliding member according to claim 1, wherein the high pearlite phase portion includes
    thin regions and
    thick regions having a greater thickness than a thickness of the thin regions, the thin regions and the thick regions being alternately disposed.

10. The sliding member according to claim 9, wherein the sliding member has a cylindrical shape such that the high pearlite phase portion includes the thin regions and the thick regions alternately disposed in a circumferential direction of the cylindrically shaped sliding member.

11. The sliding member according to claim 10, wherein the high pearlite phase portion has an average thickness of 50 to 400 μm, the thick regions having a thickness greater than or equal to the average thickness of the high pearlite phase portion and the thin regions having a thickness less than the average thickness of the high pearlite phase portion;
    wherein a difference between an average thickness of the thick regions and an average thickness of the thin regions is not less than 30% of the average thickness of the high pearlite phase portion; and
    wherein an average length between adjacent thick regions in the circumferential direction of the cylindrically shaped sliding member is 50 to 400 μm.

12. The sliding member according to claim 10, wherein an area ration of the thick regions is 20 to 50% of the surface of the high pearlite phase portion facing the sliding layer.

* * * * *